United States Patent [19]

Kólya et al.

[11] Patent Number: 4,655,317
[45] Date of Patent: Apr. 7, 1987

[54] SOUND DAMPING DEVICE, PREFERABLY FOR REDUCING THE NOISE OF BLOW-OFF VALVES

[75] Inventors: Tibor Kólya, Budapest; Béla Szöke; Károly Kádár, both of Miskolc; György Fóti, Budapest; Zoltán Gecsei, Miskolc, all of Hungary

[73] Assignees: Autóipari Kutató és Fejlesztü Vállalat, Budapest; Északmagyarországi Vegyimûyek, Sajóbábony, both of Hungary

[21] Appl. No.: 734,649

[22] Filed: May 16, 1985

[30] Foreign Application Priority Data

May 22, 1984 [HU] Hungary .............................. 1969/84

[51] Int. Cl.$^4$ .............................................. F01N 1/24
[52] U.S. Cl. .................................... 181/257; 181/258
[58] Field of Search ......... 181/242, 257, 258, DIG. 1; 251/118

[56] References Cited

U.S. PATENT DOCUMENTS

| | | | |
|---|---|---|---|
| 1,326,647 | 12/1919 | Kehan | 181/258 X |
| 1,627,324 | 5/1927 | Green | 181/258 |
| 2,600,236 | 6/1952 | Gibel | 181/257 |
| 3,826,281 | 7/1974 | Clark | 251/118 X |

Primary Examiner—Benjamin R. Fuller
Attorney, Agent, or Firm—Spencer & Frank

[57] ABSTRACT

A sound damping device for suppressing the noise generated by a gas stream emitted by a blow-off valve includes a body of a porous, resiliently readily compressible material traversed by the gas stream and a nipple projecting into the body and having a passage oriented coaxially with the axis of the body. The passage has an inlet opening adapted to receive the gas stream from the valve and a sound suppressing outlet being spaced from the inlet opening and being situated within the body. There is further provided a deformable outer layer which substantially entirely surrounds the body and is bonded thereto. The outer layer, similarly to the body, is permeable to air.

11 Claims, 4 Drawing Figures

SOUND DAMPING DEVICE, PREFERABLY FOR REDUCING THE NOISE OF BLOW-OFF VALVES

BACKGROUND OF THE INVENTION

Mechanical equipments and storage vessels (tanks) operated with a gaseous medium, in particular with pressurized air, are regulated by safety valves (blow-off valves) by releasing air in case of overpressure in a proper quantity from the delivery duct of the equipment or the tank into the atmosphere for a short span of time. This process is known as blowing off. The air streaming or accelerating through the valve generates noise under the influence of non-stationary forces when coming into contact with solid bodies. This noise lasts as long as the pressure in the tank or duct is being reduced to the required value and the blow-off valve is open. The noise is the result of the conversion of pressure energy in a very short time, and accordingly it is characterized by a high level and a wide band. First of all, turbulence is causing the noise and begins to be effective at about 500 Hz and increases rapidly with increased frequency. At the same time a low frequency noise spectrum also appears which contains the acoustic state of the environment of blow-off too. The peak is mostly formed at the frequency of the fundamental resonance of the closed space—where blow-off is taking place—which decreases with increased frequency. The two fundamental spectra are meeting in the middle-frequency field, where the noise of blow-off is the lowest.

In order to reduce environmental acoustic trauma affecting people, noises of blow-off valves are to be supressed, and therefore, for example, blow-off valves of pneumatic brake systems of vehicles, blow-off valves in pneumatic systems in workshops are to be provided with noise damping devices.

With blow-off valves of known pneumatic systems silencers made of sintered bronze have been used, wherein a part of the noise-energy of the streaming blow-off air is converted into heat by friction. These sound damping devices suppress high-frequency noises, however, they are scarcely effective against low-frequency noises. Their size, and thus their weight and cost depend on the quantity of the air to be blown off during a unit of time. Generally, they are made of cylindrical rods with a considerable space requirement which is to be considered, together with possibilities of installation when planning pneumatic systems.

SUMMARY OF THE INVENTION

The object of the invention was to develop a noise damping device of the above type which is easily placeable without restrictions, which is of less weight, which can be produced at lower costs and which has better properties in respect to noise reduction.

In order to achieve the above affect, the applicability of synthetic foams, was tested. The sound absorbing properties of these materials are well known and are widely used in closed spaces for noise suppression in air channels of low velocity. Also, they can be elastically deformed to a great extent.

This object and others to become apparent as the specification progresses, are achieved by the invention, according to which, briefly stated, the sound damping device for suppressing the noise generated by a gas stream emitted by a blow-off valve includes a body of a porous, resiliently readily compressible material traversed by the gas stream and a nipple (also referred to as a "fitting member" or "medium-introducing member") projecting into the body and having a passage (also referred to as a "medium-introducing channel") oriented coaxially with the axis of the body. The passage has an inlet opening adapted to receive the gas stream from the valve and a sound suppressing outlet being spaced from the inlet opening and being situated within the body. There is further provided a deformable outer layer which substantially entirely surrounds the body and is bonded thereto. The outer layer, similarly to the body, is permeable to air.

According to a preferred embodiment of the invention the porous body is made of polyurethane foam having a bulk density surpassing 40 g/dm$^3$, preferably 75 to 85 g/dm$^3$, and an elastic deformability of at least 25%. The outer layer is formed by a polyurethane prepolymer—optionally a polyester or epoxy resin lacquer. The air permeability of the porous material united with the outer layer must not be more than maximally one half of air—permeability of the body made of porous material.

According to our experiences, acoustically dimensioned solutions, verified by empirical measurements, showing good sound-insulating properties, have the following proportions in case of a spherical body made of a porous material:

$$\frac{D_g}{D_c} \geq 10; \frac{V_b}{V_g} \leq 0.15; \frac{D_g}{L_b} \geq 3.5; \frac{D_g}{L_c} \geq 2; \frac{F_f}{F_c} < 1$$

wherein $D_g$ = the outer diameter of the body made of a porous material $D_c$ = diameter of the medium-introducing channel of the fitting member, $V_b$ = volume of the medium-introducing channel of the fitting member, $V_g$ = volume of the body made of a porous material, $L_b$ = length of the fitting member within the porous body, $L_c$ = length of the medium-introducing channel of the fitting member, $F_f$ = surface of the medium-discharging opening (the acoustically characterizing opening among the openings) of the fitting member, $F_c$ = surface of the medium-introducing channel of the fitting member.

The inner diameter of the medium-introducing channel of the synthetic fitting member, made of a material with a Young-modulus of at least $E = 5.6 \times 10^9$ N/m$^2$ was so selected that it should be less than one half of the length of the sound-wave propagating in the gas stream in the frequency range between 31 and 10 000 Hz.

The fitting member has a central medium discharging opening arranged co-axially with the medium-introducing channel and further, medium-discharging openings which enclose an angle of about 50° with the axis of the fitting member and which have an outlet area identical to or smaller than that of the central opening.

BRIEF DESCRIPTION OF THE DRAWING

FIG. 3 is the characteristic of the noise induced by a blow-off valve without the sound-damping device and the characteristic of the noise suppressed by the sound-damping device according to FIG. 1.

DESCRIPTION OF THE PREFERRED EMBODIMENT

Figure 1:
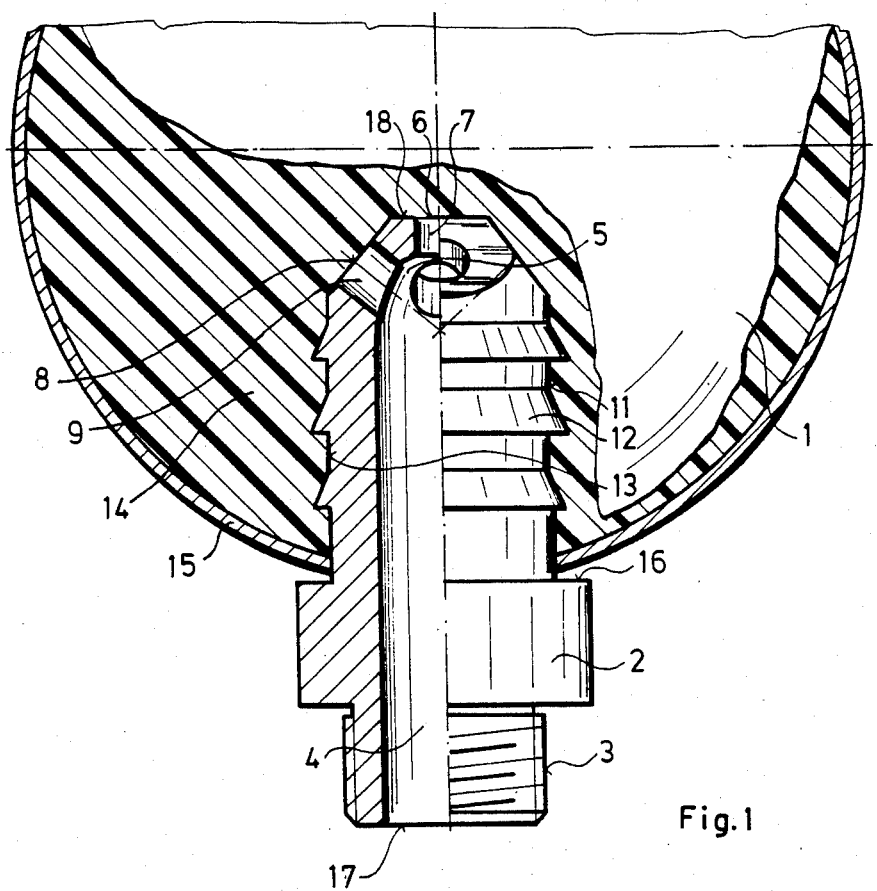
FIG. 1 is a longitudinal sectional view of a preferred embodiment of the invention.
Figure 2:
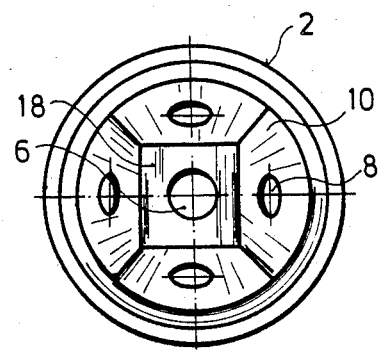
FIG. 2 is an end view of one component of the structure shown in FIG. 1.

Turning to FIGS. 1 and 2, a noise damping device 1 shown therein has a fitting member 2 provided with a thread 3, by which it can be connected to the pneumatic blow-off valve not illustrated here. The medium-introducing channel 4 in the fitting member 2 is cylindrically shaped with sound-insulating smooth walls up to the discharging tract 5. The fitting member 2 is made of the sound-insulating material known as danamide, its Young-modulus being more than $E = 5.6 \times 10^9$ N/m$^2$, which is considered as the lowest limit value. The inner diameter of the medium introducing channel 4 equals 10 mm, which is less than the half of the length of the sound wave propagating in the gas stream in the frequency range between 31 and 10 000 Hz. The central medium-discharging opening 6 and its short channel 7 are coaxially arranged with the medium-introducing channel 4. Their cross-sectional area is smaller than that of cross-sectional area of the channel 4. Axes of further medium-discharging opening 8 and channels 9 enclose an angle of 50° with the axis of the medium-introducing channel 4. The medium-discharging openings 8 lie on flat end faces 10 of the fitting member 2. The sum of the area of the central medium-discharging opening 6 and medium-discharging openings 8 must not exceed the cross-sectional area of the medium-introducing channel 4.

On the outer mantle 11 of the fitting member 2 shoulders 12 are formed for anchoring safely the fitting member 2 in the nest 13 of the spherical body 14 made of polyurethane foam forming the porous body with an open cell structure. Molar weight of polyol used for producing the polyurethane foam is 6000; otherwise, it is imperative that molar weight be more than 3000. Primary OH content is more than 20%; there is used an isocyanate which is a mixture of MDI and TDI although either one or the other can be used as well. Bulk weight of polyurethane foam must exceed 40 g/dm$^3$, preferably 75 to 85 g/dm$^3$, its elasticity should be over 25%.

Permeability to air of the polyurethane foam forming the spherical body 14, measured on a cut sample of the size 50×50×25 mm, in direction of the 25 mm thickness is as follows:
at a differential pressure of 0.2 mm water column 2.0–3.0 l/minute
at a differential pressure of 0.3 mm w.column 3.0–5.00 l/minute
at a differential pressure of 0.5 mm w.column 5.0–7.0 l/minute.

In the embodiment described the fitting member 2 is glued into the spherical body 14, whose outer diameter of the spherical body is 70 mm. By blowing air through the medium-introducing channel 4 the following permeability to air was measured:
0.2 mm w.c. differential pressure 6.0 to 8.0 l/minute
0.3 mm w.c. differential pressure 8.5 to 11.00 l/minute
0.5 mm w.c. differential pressure 12.0 to 15.0 l/minute.

The above three measurements were taken at a time when the body 14 was not yet provided with the permeable, but sound insulating outer layer 15. After having dipped the spherical body 14 made of polyurethane foam into a polyurethane prepolymer solution, on the cut sphere-surface a continuous coating will be formed which is permeable to air and, at the same time, sound-insulating. The finished sound-damping device 1 provided with the outer layer 15 yields the following values of permeability to air when air is blown through the channel 4:
at a differential pressure of 0.2 mm water column 1.6 l/minute
at a differential pressure 0.3 mm w.c. 2.5 l/minute
at a differential pressure 0.5 mm w.c. 3.6 l/minute Permeability to air of the spherical body 14 made of polyurethane foam and provided with the outer layer 15 is less than one half of the usual value, in the described embodiment it is, on the average, not more than one quarter.

At critical pressure ratios or above, the permeability of the noise damping device according to the invention is about 1 l/minute.

To achieve advantageous noise damping properties, the noise damping device 1 should have the following proportions:

$$\frac{D_g}{D_c} = \frac{7}{1} = 7; \quad \frac{V_b}{V_g} = \frac{3.925}{179.5} = 0.02;$$

$$\frac{D_g}{L_b} = \frac{7}{3} = 2.33; \quad \frac{D_g}{L_c} = \frac{7}{5} = 1.4$$

wherein:
$D_g$ = the outer diameter of the polyurethane spherical body 14
$D_c$ = the diameter of the medium introducing channel 4
$V_b$ = the volume of the medium introducing channel 4
$V_g$ = the volume of the polyurethane spherical body 14
$L_b$ = the length of the fitting member 2 in the nest 13 of the polyurethane spherical body 14, i.e. the distance between the frontal surface 18 and the shoulder 16,
$L_c$ = the length of the medium introducing channel 4 of the fitting body 2 that is essentially the distance between the frontal surface 18 and the inlet opening 17.

FIG. 3 shows the characteristic (I) of the noise measured at a valve, blowing-off from pressures exceeding the critical value, and further illustrates the characteristic (II) of the noise having been suppressed by the noise damping device 1 according to the invention. As it may be clearly observed, the extent of noise suppression is considerable, in particular in ranges below 250 Hz and above 2 kHz.

Figure 4:
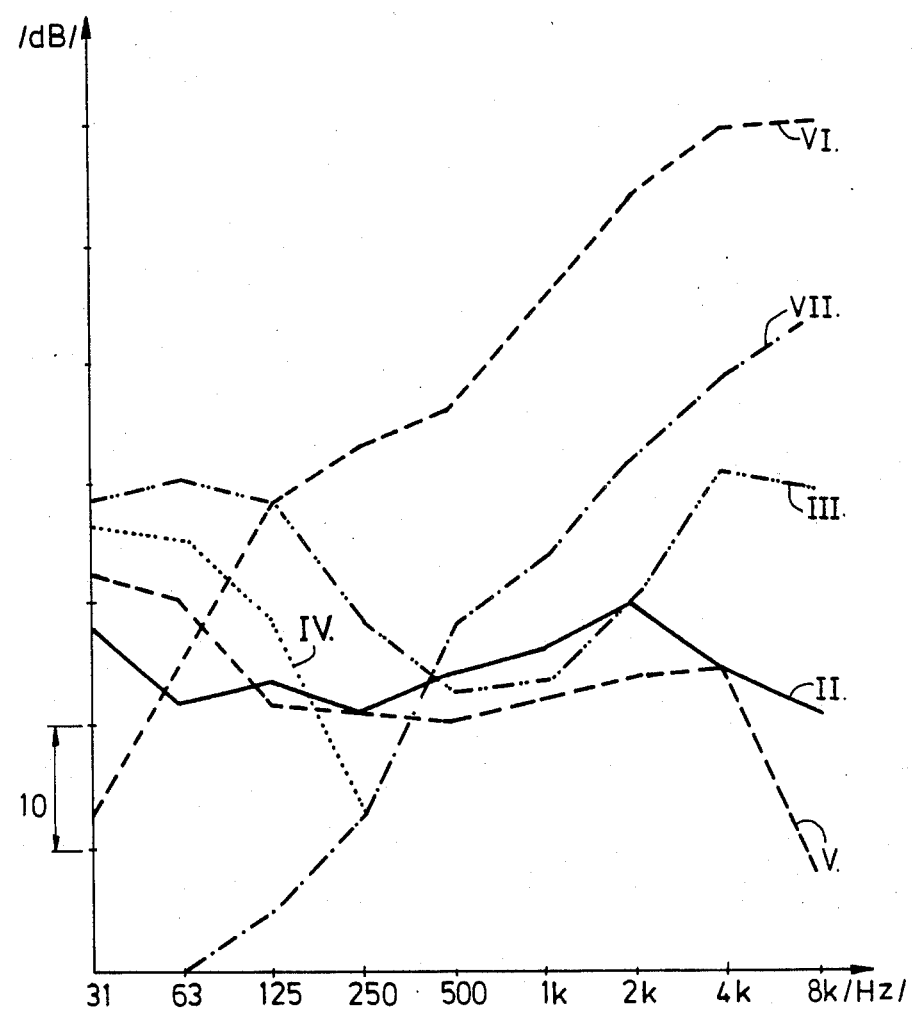
FIG. 4 is the characteristic of the suppressed noise according to FIG. 3 and the single components thereof.

In FIG. 4 the characteristic (II) of the noise reduced by the noise damping device 1 is again shown, as well as the component curves (III to V) thereof which are, calculated curves. Curve III relates to the calculated effect of the fitting member 2, curve IV relates to the calculated effect of the polyurethane foam spherical body 14 and curve V relates to the calculated resulting suppressed noise. Calculated shock noise of the blow-off valve to be damped is plotted on curve VI, while calculated turbulence is plotted in curve VII.

Forming an acoustic system, the noise damping device 1 according to the invention operates as follows:

From the point of view of the noise to be damped arising in the course of blowing off, the pressure ratio of air pressure before and after the blow-off valve represents a fundamental factor; even with a pressure ratio of 1.89 air is streaming from the valve with sound velocity. Accordingly, a choked stream is produced through the blow-off valve, which means that the mass flow is reaching its maximal value. Now two noise inducing mechanisms are formed. One arises due to mixing of the turbulent gas with the stationary air after (downstream of) the blow-off valve, resulting in a turbulence noise (FIG. 4—curve VII), while the other is the shock noise, arising from the interaction between turbulence and the field of flow (FIG. 4—curve VI). As long as the pressure ratio is less than three, it suffices to consider turbulence noise, if it is larger than three, shock noise is playing an important role in noise induction. In order to achieve perfect operation of the noise-damping device 1 within a wide range of pressure ratios, the effect of both noise inducing mechanisms is to be damped. In this case the noise damping device 1 is well suitable for the sound suppression of blow-off valves having a pressure less than $3 \times 10^5$ Pa. A typical blow-off noise of the blow-off valve is plotted by curve I of FIG. 3. After having calculated probable development of spectra of the shock noise (FIG. 4—curve VI) and turbulence noise (FIG. 4—curve VII), it becomes apparent that the shock noise does not play a role in producing the fundamental spectra of the blow-off noises, resulting from the pressure ratio. The means that the noise spectrum of the blow-off process is fundamentally defined by turbulence noise, resulting partly from non-stationary forces, partly from mixing with stationary air. In order to obtain a successful noise suppression, a noise damping device 1 forming an acoustic system is fitted to the free opening of the blow-off valve, at the end of which pole effects cannot prevail.

The gas streaming from the blow-off valve and the noise generated therein arrives at the medium-introducing channel 4 of the fitting member 2. From the point of view of acoustics the channel 4 is one-dimensional, which means that within the audible range it has an acoustic effect only in direction of its length. In this channel mixing of turbulence is taking place in a completely closed space, and consequently, there is no contact with the stationary air of the outer space. In addition, by the sound-insulating design of the discharging tract 5 of the fitting member it is achieved that the sound energy travelling into the spherical body 14 is substantially free from any accessory pipe-noise. Considering that the impedance of the discharging tract 5 of the fitting member 2 differs from the impedance of the inlet openings 17 due to medium-discharging openings 6 and 8 and the channels 7 and 9, respectively, sound waves in the medium-introducing channel 4 will be reflected, and accordingly, less sound energy will pass through the medium-discharging openings 6 and 8. The next location of reflection of the acoustic adaption is the porous material closing the medium-discharging openings 6 and 8. This is the so-called bore-reflection effected by the spherical body 14.

In the low-frequency range the porous material is taking part in the attenuation of fluctuations in sound pressures with its mass, which means that it is performing sound insulation. In the high-frequency range the mass intertia of the porous material is causing attenuation, as the air particles penetrate in the pores and lose a considerable part of their kinetic energy. The outer layer 15 is united—due to its consistency—with the spherical body 14 made of polyurethane foam. Thus, the layer 15 is connected functionally to the porous material, it increases its energy dissipation resulting from sound absorption by sound insulation without affecting disadvantageously the discharge of the blown-off gas. The outer layer 15 protects the spherical body 14 made of polyurethane foam against external contaminations, moisture, etc. which could adversely influence acoustic properties.

We claim:

1. In a sound damping device for suppressing the noise generated by a gas stream emitted by a blow-off valve; the device including a body of a porous material traversed by the gas stream; the improvement wherein said body is readily resiliently deformable and has a central axis; a nipple projecting into said body and having a passage oriented coaxially with said axis; said passage having an inlet opening adapted to receive the gas stream from the valve; said nipple further including means for defining a sound suppressing outlet in said passage; said sound suppressing outlet being spaced from said inlet opening and being situated within said body; further comprising an outer layer substantially entirely surrounding said body and being bonded thereto; said outer layer being deformable and being permeable to air.

2. A sound damping device as defined in claim 1, wherein said body is spherical.

3. A sound damping device as defined in claim 1, wherein said body is of polyurethane foam having a volumetric weight of at least 40 g/dm$^3$ and an elastic deformability of at least 25%.

4. A sound damping device as defined in claim 3, wherein said volumetric weight is between 75 and 85 g/dm$^3$.

5. A sound damping device as defined in claim 1, wherein said outer layer is of a material selected from a group consisting of polyurethane prepolymer, polyester and epoxy resin lacquer.

6. A sound damping device as defined in claim 1, wherein the permeability to air of the assembly consisting of said body and said outer layer is at the most one half of the permeability to air of said body.

7. A sound damping device as defined in claim 1, wherein said nipple is accommodated in said body in a closely fitting aperture thereof.

8. A sound damping device as defined in claim 7, wherein said nipple is immobilized in said aperture by an adhesive bonding said nipple to wall portions of said body defining said aperture.

9. A sound damping device as defined in claim 1, wherein said means for defining a sound suppressing outlet comprises a central opening arranged coaxially with said central axis and a plurality of additional openings surrounding said central opening and each having a passage axis arranged at an angle of approximately 50° to said central axis as viewed in a direction pointing from said inlet opening of said nipple towards said outlet thereof; each said additional opening having a cross-sectional passage area of a size not exceeding that of said central opening.

10. A sound damping device as defined in claim 9, wherein said passage of said nipple has a cross-sectional area at least as large as the combined cross-sectional passage areas of said central opening and said additional openings.

11. A sound damping device as defined in claim 1, wherein said body has an outer diameter $D_g$, and a volume $V_g$; said passage has a diameter $D_c$, a volume $V_b$, a length $L_c$ and a cross-sectional area $F_c$; said outlet has an area $F_f$, and said nipple has a length portion $L_b$ extending within said body; further wherein $D_g:D_c$ is at least 10; $V_b:V_g$ is at the most 0.15; $D_g:L_b$ is at least 3.5; $D_g:L_c$ is at least 2 and $F_f:F_c$ is smaller than 1.

* * * * *